(12) United States Patent
Grassi et al.

(10) Patent No.: US 11,706,104 B2
(45) Date of Patent: Jul. 18, 2023

(54) INFERRING QUALITY OF EXPERIENCE (QOE) BASED ON CHOICE OF QOE INFERENCE MODEL

(71) Applicant: Cisco Technology, Inc., San Jose, CA (US)

(72) Inventors: Giulio Grassi, Paris (FR); Giovanna Carofiglio, Paris (FR); Michele Papalini, Issy les Moulineaux (FR); Enrico Loparco, Boulogne-Billancourt (FR); Jacques Olivier Samain, Paris (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/347,728

(22) Filed: Jun. 15, 2021

(65) Prior Publication Data

US 2022/0400063 A1    Dec. 15, 2022

(51) Int. Cl.
*H04L 41/5006* (2022.01)
*H04L 47/11* (2022.01)
*G06N 5/04* (2023.01)
*H04L 43/04* (2022.01)
*H04L 43/062* (2022.01)
*H04L 47/2441* (2022.01)

(52) U.S. Cl.
CPC .......... *H04L 41/5006* (2013.01); *G06N 5/04* (2013.01); *H04L 43/04* (2013.01); *H04L 43/062* (2013.01); *H04L 47/11* (2013.01); *H04L 47/2441* (2013.01)

(58) Field of Classification Search
CPC ... H04L 41/5006; H04L 43/04; H04L 43/062; H04L 47/11; H04L 47/2441; G06N 5/04
See application file for complete search history.

(56) References Cited

U.S. PATENT DOCUMENTS

| 8,593,964 B1 * | 11/2013 | Sinha | ...................... H04L 47/11 370/235 |
| 8,681,614 B1 * | 3/2014 | McCanne | ............. H04L 47/522 370/230 |
| 2011/0007648 A1 | 1/2011 | Liu et al. | |

(Continued)

OTHER PUBLICATIONS

Suying Yan et al., "Enabling QoE Learning and Prediction of WebRTC Video Communication in WiFi Networks", 2015, 6 pages.

(Continued)

*Primary Examiner* — Brian Whipple
*Assistant Examiner* — James Ross Hollister
(74) *Attorney, Agent, or Firm* — Edell, Shapiro & Finnan, LLC (57) ABSTRACT

In one example, a location of a potential bottleneck of network traffic in a network is identified. Based on the location of the potential bottleneck, a first QoE inference model is selected from a plurality of respective QoE inference models. The respective QoE inference models are each trained to infer a respective QoE of the network traffic based on one or more respective network traffic metrics generated by monitoring the network traffic at a respective location in the network. One or more first network traffic metrics of the one or more respective network traffic metrics are generated by monitoring the network traffic at a first respective location. The one or more first network traffic metrics are provided to the first QoE inference model to infer a first respective QoE.

20 Claims, 5 Drawing Sheets

(56) References Cited

U.S. PATENT DOCUMENTS

| | | | |
|---|---|---|---|
| 2013/0290223 A1* | 10/2013 | Chapelle | G06N 20/00 706/12 |
| 2014/0215058 A1* | 7/2014 | Vicat-Blanc | H04L 43/14 709/224 |
| 2015/0074285 A1* | 3/2015 | Gahm | H04L 47/11 709/231 |
| 2018/0041788 A1 | 2/2018 | Wang et al. | |
| 2019/0222491 A1* | 7/2019 | Tomkins | H04L 41/0823 |
| 2019/0370218 A1* | 12/2019 | Di Pietro | G06K 9/6253 |
| 2021/0097431 A1* | 4/2021 | Olgiati | G06N 5/046 |
| 2022/0045967 A1* | 2/2022 | Hu | H04L 47/781 |

OTHER PUBLICATIONS

Ashkan Nikravesh et al., "QoE Inference Without Application Control", Proceedings of the 2016 workshop on QoE-based Analysis and Management of Data Communication Networks, Aug. 22-26, 2016, 6 pages.

Pedro Casas et al., "Improving QoE Prediction in Mobile Video through Machine Learning", 2017 8th International Conference on the Network of the Future (NOF), Nov. 2017, 8 pages.

M. Hammad Mazhar et al., "Real-time Video Quality of Experience Monitoring for HTTPS and QUIC", IEEE Infocom 2018—IEEE Conference on Computer Communications, Apr. 16-19, 2018, 9 pages.

Raimund Schatz et al., "Passive YouTube QoE Monitoring for ISPs", 2012 Sixth International Conference on Innovative Mobile and Internet Services in Ubiquitous Computing, Jul. 4-6, 2012, 7 pages.

Giorgos Dimopoulos et al., "Measuring Video QoE from Encrypted Traffic", Proceedings of the 2016 Internet Measurement Conference, Nov. 14-16, 2016, 14 pages.

Francesco Bronzino et al., "Inferring Streaming Video Quality from Encrypted Traffic: Practical Models and Deployment Experience", Proc. ACM Meas. Anal. Comput. Syst., vol. 3, No. 3, Article 56, Dec. 2019, 25 pages.

Divyashri Bhat, "Qoe-Aware Content Distribution Systems for Adaptive Bitrate Video Streaming", Doctoral Dissertations, 1811, Mar. 2020, 191 pages.

Ashkan Nikravesh et al., "QoE Inference and Improvement Without End-Host Control", 2018 Third ACM/IEEE Symposium on Edge Computing, Oct. 25-27, 2018, 15 pages.

\* cited by examiner

INFERRING QUALITY OF EXPERIENCE (QOE) BASED ON CHOICE OF QOE INFERENCE MODEL

TECHNICAL FIELD

The present disclosure relates to computer networking.

BACKGROUND

Quality of Service (QoS) has traditionally been used to approximate network performance based on certain network metrics. Recently, Quality of Experience (QoE) has gained increasing importance because QoE describes the quality of an end user's experience with a given service. That is, QoE measures the level of end user satisfaction with a service.

DESCRIPTION OF EXAMPLE EMBODIMENTS

Overview

Techniques are described herein for inferring Quality of Experience (QoE) based on a choice of QoE inference model. In one example embodiment, a location of a potential bottleneck of network traffic in a network is identified. Based on the location of the potential bottleneck, a first QoE inference model is selected from a plurality of respective QoE inference models. The respective QoE inference models are each trained to infer a respective QoE of the network traffic based on one or more respective network traffic metrics generated by monitoring the network traffic at a respective location in the network. One or more first network traffic metrics of the one or more respective network traffic metrics are generated by monitoring the network traffic at a first respective location. The one or more first network traffic metrics are provided to the first QoE inference model to infer a first respective QoE.

Example Embodiments

Figure 1:
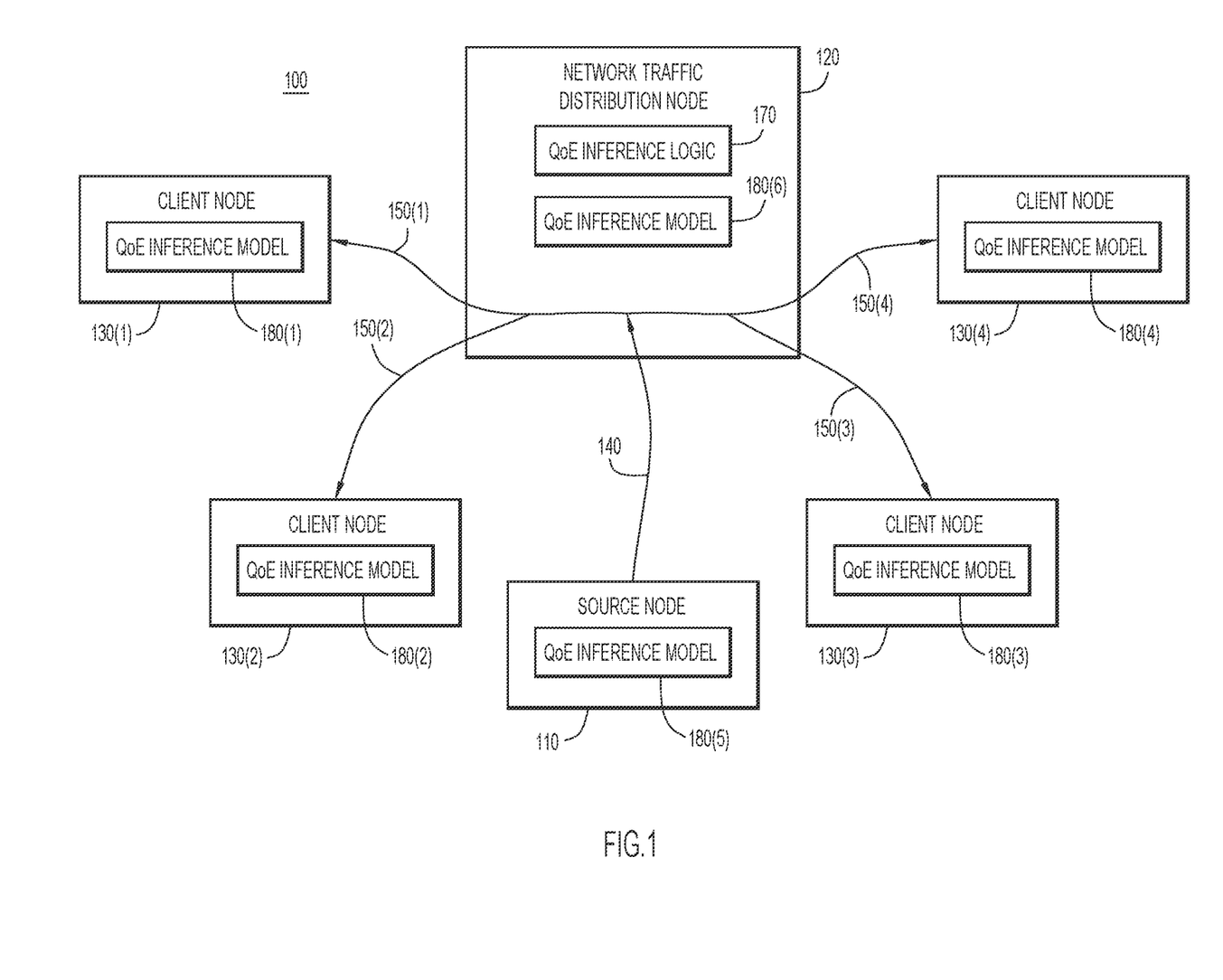
FIG. 1 illustrates a system configured to infer a Quality of Experience (QoE) based on a QoE inference model selected from multiple candidate QoE inference models, according to an example embodiment.

FIG. 1 illustrates a system 100 configured to infer a Quality of Experience (QoE). System 100 includes source node 110, network traffic distribution node 120, and client nodes 130(1)-130(4). Source node 110 and client nodes 130(1)-130(4) may include any suitable devices such as servers or user endpoint devices (e.g., smartphones, laptops, etc.). Network traffic distribution node 120 may include one or more servers, such as a video bridge and/or teleconference hosting server.

System 100 may provide a multiparty streaming service. In one example, source node 110 may be a content provider that simultaneously streams network traffic 140 (e.g., audio and/or video content) to client nodes 130(1)-130(4) through network traffic distribution node 120. Network traffic distribution node 120 may stream network flows 150(1)-150(4) (e.g., different versions of the same video and audio content) to client nodes 130(1)-130(4). Network traffic distribution node 120 may provide the network flows at different qualities depending on specific network conditions, such as network congestion, network capabilities, etc.

Inferring QoE is a challenging task. Previous attempts have tried to adopt machine-learning models to infer QoE from network traces, but these attempts are largely unsuccessful because they took a "single-model-fits-all" approach. That is, previous attempts use only a single model to infer QoE based on data collected from any arbitrary vantage point(s) in the network. This approach often fails because different vantage points can provide different views of the network depending on where network impairments are located. For example, network traffic after a lossy link may show packet losses, but network traffic before the lossy link may not. This problem persists in the case of bidirectional flows—even for network traffic transiting between the same pair of nodes—because observing different directions of the network traffic can provide discordant views of the network. Therefore, models trained on vantage points before or after a given impairment may fail to properly infer QoE because the models can be trained only on partial views of the network.

Accordingly, in order to resolve the aforementioned problems with previous attempts to infer QoE, QoE inference logic 170 is provided on network traffic distribution node 120. QoE inference logic 170 causes network traffic distribution node 120 to perform operations described herein. While QoE inference logic 170 is shown in FIG. 1 on network traffic distribution node 120, in other examples QoE inference logic 170 may also/alternatively be provided on or near: source node 110; client nodes 130(1)-130(4); transit network nodes configured to carry network traffic 140 and/or network flows 150(1)-150(4) (e.g., next-hop nodes of source node 110, network traffic distribution node 120, or client nodes 130(1)-130(4)); one or more servers that are internal or external to system 100 (e.g., collaboration cloud servers and/or on-premise devices); the edge of the network; Wi-Fi® access points; etc.

QoE inference models 180(1)-180(6) are also provided. Specifically, QoE inference models 180(1)-180(4) are provided on client nodes 130(1)-130(4); QoE inference model 180(5) is provided on source node 110; and QoE inference model 180(6) is provided on network traffic distribution node 120. In other examples, QoE inference models 180(1)-180(6) may be provided on one or more transit network nodes configured to carry network traffic 140 and/or network flows 150(1)-150(4) (e.g., next-hop nodes of source node 110, network traffic distribution node 120, or client nodes 130(1)-130(4)), or one or more servers that are internal or external to system 100.

QoE inference logic 170 may cause network traffic distribution node 120 to select an optimal QoE inference model from among QoE inference models 180(1)-180(6). Briefly, QoE inference models 180(1)-180(6) may be trained based on different vantage points in the network; the optimal QoE inference model may be selected based on observed network conditions. For example, a measured difference between network flows 150(1)-150(4) may be used to determine the presence and location of a bottleneck, and the location of the bottleneck may be used to select the optimal QoE inference model for inferring QoE. Thus, these techniques may improve QoE inference of multiparty streaming flows/applications by locating network impairments/bottlenecks with respect to a vantage point, the content provider (e.g., source node 110), and receivers (e.g., client nodes 130(1)-130(4)).

Initially, QoE inference models 180(1)-180(6) may each be trained to infer a respective QoE of network traffic (e.g., network flows 150(1)-150(4)). The training may be performed offline. For instance, experiments may be run in a controlled environment that includes a content streaming node, a training network traffic distribution node, and a plurality of receivers. Different monitoring/vantage points may be deployed at different locations in the controlled environment to train each of QoE inference models 180(1)-180(6) for each vantage point.

QoE inference models 180(1)-180(6) may be trained by monitoring network traffic and the client QoE and evaluating the relationship between the network traffic and the client QoE. The outcome of this training phase may be QoE inference models 180(1)-180(6), each trained on a different dataset corresponding to a different location in the controlled environment: QoE inference models 180(1)-180(4) may be trained on a dataset collected at the receivers; QoE inference model 180(5) may be trained on a dataset collected at the content streaming node; and QoE inference model 180(6) may be trained on a dataset collected at the training network traffic distribution node.

QoE inference models 180(1)-180(4) may be trained based on network traffic monitored close to the receivers (e.g., at the receiver, a base station, or a next-hop node of the receiver, such as a home router). The network traffic monitored close to the receiver may be similar or identical to the network traffic obtained by the receiver. If a bottleneck exists between the content streaming node and a training network traffic distribution node, the effects of the bottleneck may appear in the monitored network traffic. As a result, QoE inference models 180(1)-180(4) may be optimized for cases where the bottleneck is located between the content streaming node and the training network traffic distribution node. QoE inference model 180(5) may be monitored based on network traffic monitored close to a content streaming node (e.g., at the content streaming node, a base station, or a next-hop node of the content streaming node).

QoE inference model 180(6) may be monitored based on network traffic monitored close to the training network traffic distribution node (e.g., at the training network traffic distribution node, a base station, or a next-hop node of the training network traffic distribution node). The network traffic monitored close to the training network traffic distribution node may provide a partial view of the controlled environment: packet losses between the content streaming node and the training network traffic distribution node may appear in the network traffic, but packet losses between the training network traffic distribution node and the receivers may not. As a result, QoE inference model 180(6) may cope with a partial view of network impairments, having less accuracy compared to QoE inference models 180(1)-180(4) in case bottleneck effects appear in the network traffic.

Thus, when the bottleneck is located between the content streaming node and the training network traffic distribution node, QoE inference models 180(1)-180(4) may be more accurate than QoE inference model 180(6) because QoE inference models 180(1)-180(4) may be fully trained on this situation. If the bottleneck is located between the training network traffic distribution node and the receivers, QoE inference model 180(6) may outperform QoE inference models 180(1)-180(4), which may not be trained for this case. QoE inference models 180(1)-180(4) may be the default models applied to achieve higher accuracy, and QoE inference model 180(6) may be applied in situations for which QoE inference models 180(1)-180(4) have not been trained.

Once trained, QoE inference models 180(1)-180(6) may infer respective QoEs based on one or more respective network traffic metrics generated by monitoring network traffic (e.g., network flows 150(1)-150(4)) at respective locations in the network. QoE inference models 180(1)-180(4) may be trained to infer QoEs based on one or more respective network traffic metrics generated by monitoring network flows 150(1)-150(4) at client nodes 130(1)-130(4), respectively. QoE inference model 180(5) may be trained to infer a QoE based on one or more respective network traffic metrics generated by monitoring network traffic 140 at source node 110. QoE inference model 180(6) may be trained to infer a QoE based on one or more respective network traffic metrics generated by monitoring network flows 150(1)-150(4) at network traffic distribution node 120.

In one example, network traffic distribution node 120 may identify a location of a potential bottleneck of network traffic in the network. The potential bottleneck may be located between network traffic distribution node 120 and source node 110 and/or between network traffic distribution node 120 and one or more of client nodes 130(1)-130(4). Network traffic distribution node 120 may analyze network flows 150(1)-150(4) to determine where in the distribution path a bottleneck (if any) is present.

Network traffic distribution node 120 may identify the location of the potential bottleneck by determining one or more group network traffic criteria, determining one or more first network traffic criteria, and comparing the one or more group network traffic criteria to the one or more first network traffic criteria. The one or more group network traffic criteria may include any suitable criteria that collectively relate to network flows 150(1)-150(4), such as an average (e.g., mean) bit rate of network flows 150(1)-150(4). The one or more first network traffic criteria may include any suitable criteria that relate to one of network flows 150(1)-150(4), such as a bit rate of one of network flows 150(1)-150(4). The bit rate may include video and Forward Error Correction (FEC) bit rate. Other suitable network traffic criteria may include the mean or variance of jitter or loss, loss rate, flows reporting relatively high packet loss, etc. In one example, the bit rates may be measured within a given time window.

The outgoing bit rates from network traffic distribution node 120 may accurately reflect the incoming bit rates received at client nodes 130(1)-130(4) because client nodes 130(1)-130(4) may send indications to network traffic distribution node 120 to control the bit rate. For instance, a teleconferencing application running on client nodes 130(1)-130(4) may send indications to network traffic distribution node 120 to increase or decrease the bit rate. Thus, network traffic distribution node 120 may have sufficient insight to determine the location of a potential bottleneck.

Comparing the one or more group network traffic criteria to the one or more first network traffic criteria may help identify the location of the potential bottleneck. In one example, if the average bit rate of network flows 150(1)-150(4) are approximately equal to the bit rate of network flow 150(1) (for example), network traffic distribution node 120 may determine that the potential bottleneck (if any) is located between source node 110 and network traffic distribution node 120. That is, client node 130(1) is receiving approximately equal bit rates as client nodes 130(2)-130(4), which excludes a bottleneck between network traffic distribution node 120 and client node 130(1).

In another example, if the average bit rate of network flows 150(1)-150(4) is considerably higher than the bit rate of network flow 150(3), network traffic distribution node 120 may determine that a bottleneck is located between network traffic distribution node 120 and client node 130(3). That is, network flows 150(1), 150(2), and 150(4) are high-quality, which excludes an impairment both between source node 110 and network traffic distribution node 120, as well as between network traffic distribution node 120 and client nodes 130(1), 130(2), and 130(4).

In another example, network traffic distribution node 120 hosts an interactive group call in which source node 110 and client nodes 130(1)-130(4) are participating. In this example, source node 110 may be a client node with an active speaker. Network traffic 140 and network flows 150(1)-150(4) may be bidirectional, with one or more of source node 110 and client nodes 130(1)-130(4) alternating (and/or simultaneously assuming) the roles of content provider and receiver. Information relating to (bidirectional) network traffic 140 and network flows 150(1)-150(4) may be exploited to determine the location of a potential bottleneck.

In particular, network traffic distribution node 120 may compare one or more first network traffic criteria that relate to network flow 150(1) originating from source node 110, to one or more second network traffic criteria that relate to network flow 150(1) originating from client node 130(2), for example. Network traffic distribution node 120 may determine the one or more first network traffic criteria and the one or more second network traffic criteria by monitoring network traffic 140, and network flows 150(1) and 150(2). If client node 130(1) receives a higher bit rate from client node 130(2) than from source node 110 (e.g., within a given time interval, such as a few minutes), then the bottleneck may be located between source node 110 and network traffic distribution node 120. This is because client node 130(1) can gather higher-quality data streams from client node 130(2) than source node 110, which cannot provide similarly high-quality data to client node 130(1). Client nodes 130(3) and 130(4) may be similarly monitored.

Based on the presence and/or location of the potential bottleneck, network traffic distribution node 120 may select an optimal QoE inference model from QoE inference models 180(1)-180(6). Depending on the location of the potential bottleneck, one of QoE inference models 180(1)-180(6) may be more accurate than others. This is because QoE inference models 180(1)-180(6) may be trained using data from different locations in a controlled environment, and the data may change depending on the specific location of a bottleneck. That is, QoE inference models 180(1)-180(6) may observe different baseline behavior depending on the training data vantage point and bottleneck location. Accordingly, rather than using a single machine-learning model—which may not be trained for every data monitoring location and bottleneck location, and in particular may be trained only for a data monitoring location whose data would fail to indicate the presence of a bottleneck in certain circumstances—network traffic distribution node 120 may select an optimal QoE inference model from QoE inference models 180(1)-180(6) to apply on a per-case basis.

For example, if the potential bottleneck is located between source node 110 and network traffic distribution node 120, network traffic distribution node 120 may select QoE inference model 180(1) (e.g., instead of QoE inference model 180(6)) to infer the QoE associated with client node 130(1). Network traffic distribution node 120 may select QoE inference model 180(1) because QoE inference model 180(1) is fully trained for this situation. If the bottleneck is located between network traffic distribution node 120 and client node 130(3), network traffic distribution node 120 may select QoE inference model 180(6) (e.g., instead of QoE inference model 180(3)) to infer the QoE associated with client node 130(3). Network traffic distribution node 120 may select QoE inference model 180(6) because QoE inference model 180(3) is not trained for this situation.

One or more network traffic metrics may be generated by monitoring the network traffic (e.g., network traffic 140 and/or network flows 150(1)-150(4)) at a first location and providing the one or more network traffic metrics to the selected/optimal QoE inference model. The network traffic metrics may include any suitable metric, such as video frames per second.

If the bottleneck is located between source node 110 and network traffic distribution node 120, network traffic close to client node 130(1) may be monitored and provided to QoE inference model 180(1) to infer the QoE corresponding to client node 130(1). In that case, network traffic close to client nodes 130(2)-130(4) may also be monitored and provided to QoE inference models 180(2)-180(4) to infer the QoE corresponding to client nodes 130(2)-130(4), respectively. If the bottleneck is located between network traffic distribution node 120 and client node 130(3) (for example), network traffic distribution node 120 may select QoE inference model 180(6) to infer the QoE associated with client node 130(3).

If network traffic distribution node 120 hosts an interactive group call, QoE inference models 180(1)-180(6) may be selected to evaluate not only network flow 150(1) (for example), but also to evaluate all the flows directed to source node 110.

One or more of QoE inference models 180(1)-180(6) may be executed with the network traffic metrics to generate the QoEs corresponding to client nodes 130(1)-130(4). In one example, network traffic distribution node 120 (and/or other network entities) may obtain an indication of the QoE(s) and, in response, automatically perform a network action to improve the QoE(s), if necessary/desired. The network action may involve automatically mitigating network congestion due to the bottleneck to improve the QoE(s), and may include automatically issuing an alert to a network administrator to improve the QoE(s), automatically re-routing traffic to improve the QoE(s), etc.

Figure 2A:
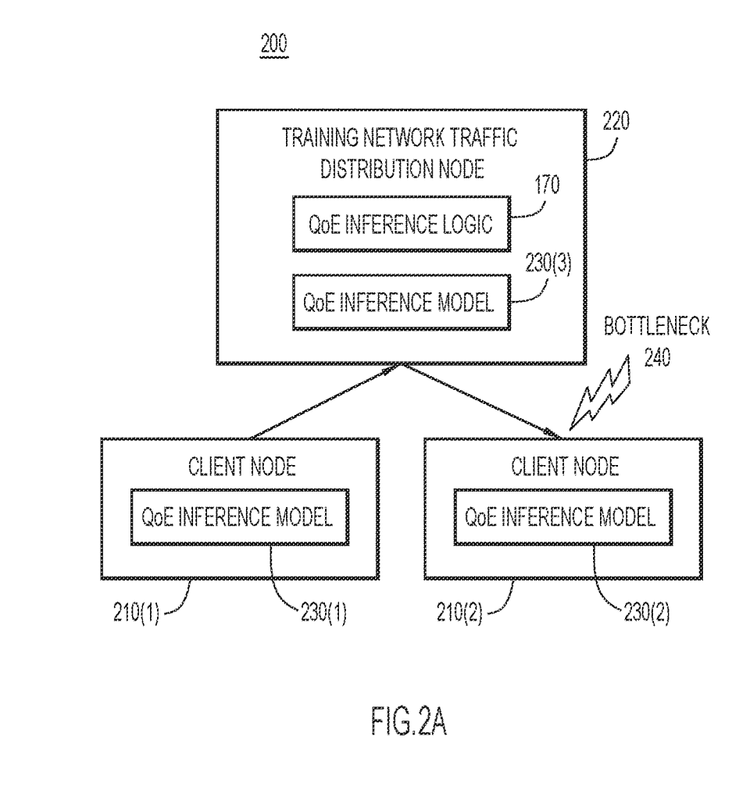
FIGS. 2A and 2B each illustrate a system configured to train multiple candidate QoE inference models to infer a QoE, according to an example embodiment.
Figure 2B:
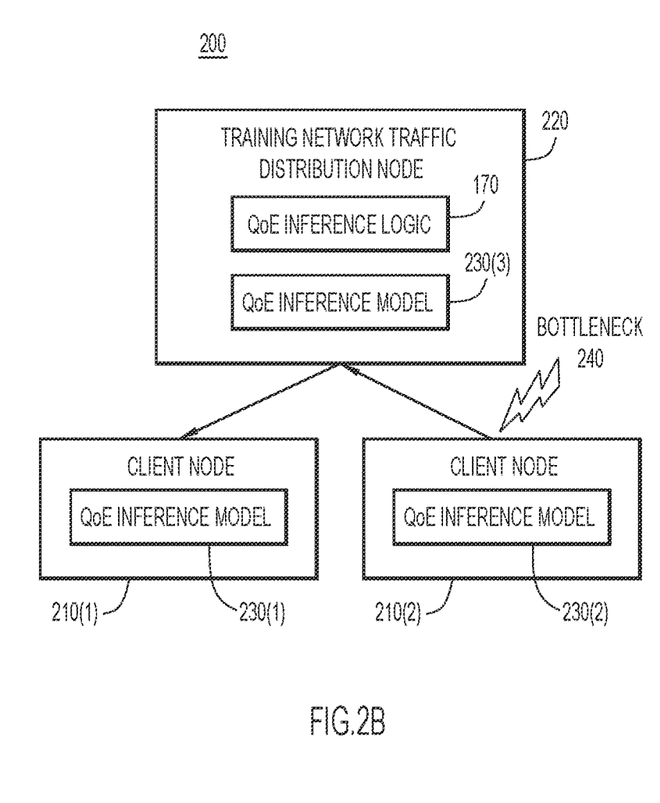

FIGS. 2A and 2B each illustrate a system 200 configured for QoE inference training. System 200 includes client nodes 210(1) and 210(2) and training network traffic distribution node 220. Client nodes 210(1) and 210(2) and training network traffic distribution node 220 include QoE inference models 230(1)-230(3), respectively. Bottleneck 240 may be present between training network traffic distribution node 220 and client node 210(2).

System 200 may provide a controlled environment in which to train QoE inference models 230(1)-230(3) to infer respective QoEs (e.g., to infer the smoothness of received video). In FIG. 2A, QoE inference models 230(2) and 230(3) may be trained based on network traffic that proceeds from client node 210(1) to training network traffic distribution node 220 to client node 210(2). In FIG. 2B, QoE inference models 230(1) and 230(3) may be trained based on network traffic that proceeds from client node 210(2) to training network traffic distribution node 220 to client node 210(1).

QoE inference models 230(1)-230(3) may be trained based on data/metrics obtained from different vantage points in system 200. QoE inference model 230(1) may be trained based on network data/metrics generated by monitoring the network traffic close to client node 210(1). QoE inference model 230(2) may be trained based on network data/metrics generated by monitoring the network traffic close to client node 210(2). QoE inference model 230(3) may be trained based on network data/metrics generated by monitoring the network traffic close to training network traffic distribution node 220. The data/metrics may include video and FEC bit rate, mean or variance of jitter or loss, loss rate, flows reporting relatively high packet loss, etc.

Once QoE inference models 230(1)-230(3) have been trained, QoE inference models 230(1)-230(3) may be instantiated in system 100. For example, QoE inference model 230(1) and/or QoE inference model 230(2) may be instantiated on client nodes 130(1)-130(4) and/or source node 110 as QoE inference models 180(1)-180(5). Similarly, QoE inference model 230(3) may be instantiated on network traffic distribution node 220 as QoE inference model 180(6). While FIGS. 2A and 2B show QoE inference models 230(1)-230(3) on client node 210(1), client node 210(2), and training network traffic distribution node 220, respectively, QoE inference models 230(1)-230(3) may be provided at any suitable network entity.

Figure 3:
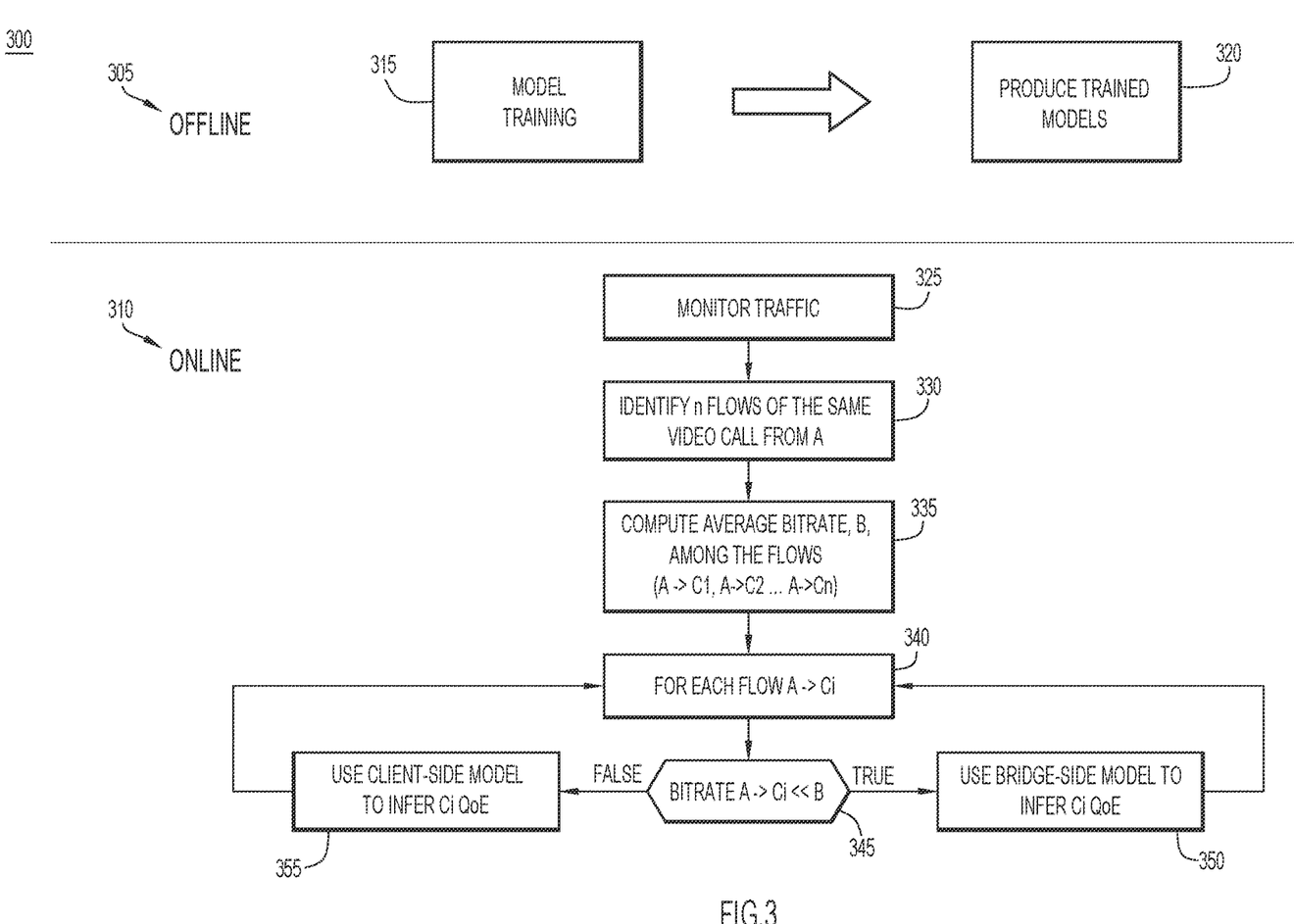
FIG. 3 illustrates a flowchart of a method for training multiple candidate QoE inference models to infer a QoE and inferring the QoE based on a QoE inference model selected from multiple candidate QoE inference models, according to an example embodiment.

FIG. 3 illustrates a flowchart of a method 300 for training multiple candidate QoE inference models to infer a QoE and inferring the QoE based on a QoE inference model selected from multiple candidate QoE inference models. Method 300 includes offline phase 305 and online phase 310. Offline phase 305 need not necessarily be performed more than once, and online phase 310 may be performed multiple times (e.g., continuously/periodically).

Offline phase 305 includes operations 315 and 320. At operation 315, multiple QoE inference models are trained. At operation 320, trained QoE inference models are produced as a result of operation 315. At least one QoE inference model may be trained based on network traffic data collected at the client side (e.g., close to the client). Thus, the client-side QoE inference model(s) may be trained based on a full view of the controlled environment because the collected data may reflect packet losses between the content streaming node and the training network traffic distribution node (e.g., video bridge), as well as packet losses between the training network traffic distribution node and the receivers. At least one other QoE inference model may be trained based on network traffic data collected at the bridge side (e.g., close to the bridge). The bridge-side QoE inference model(s) may be trained based on a partial view of the controlled environment because packet losses between the content streaming node and the training network traffic distribution node may appear in the network traffic, but packet losses between the training network traffic distribution node and the receivers may not.

Online phase 310 includes operations 325-355. At operation 325, a network traffic distribution node monitors network traffic. At operation 330, the network traffic distribution node identifies n network flows of the same video call from an active speaker A (i.e., a source node) to a plurality of client nodes C1-Cn. At operation 335, the network traffic distribution node computes the average bit rate B among the n network flows (i.e., every network flow including the network flow from A to C1 through the network flow from A to Cn).

At operation 340, the network traffic distribution node analyzes each network flow from A to Ci. At operation 345, the network traffic distribution node determines whether the bit rate from A to Ci is much less than B. For example, the network traffic distribution node may determine whether the bit rate from A to Ci is a preset or dynamically adjusted amount less than B. If the bit rate from A to Ci is much less than B, then at operation 350 the network traffic distribution node selects the bridge-side QoE inference model to infer the QoE corresponding to Ci. This is because, in this example, the bottleneck is located between the network traffic distribution node and Ci, and therefore the bottleneck impacts only Ci, in which case it may be preferable to use a partial view model. If the bit rate from A to Ci is not much less than B, then at operation 355 the network traffic distribution node selects the client-side QoE inference model to infer the QoE corresponding to Ci. This is because the bottleneck (if any) affects all network flows C1-Cn and is located between A and the network traffic distribution node, and in that case it may be preferable to use a full view model.

Table 1 below illustrates the results of a preliminary evaluation of the techniques described. For the purposes of the preliminary evaluation, a training phase was performed in a setting similar to that of FIGS. 2A and 2B, and a testing phase was performed in a setting similar to that of FIG. 1. More specifically, the testing phase occurred during a teleconference call in an uncontrolled network environment with a video bridge in the cloud. The video bridge was used as a monitoring point. The QoE inference model trained based on data collected close to one of the client nodes was used as the default QoE inference model. The QoE metric used was video frames per second. As shown, the techniques described herein outperformed consistent use of the default QoE inference model. In particular, these techniques had a higher coefficient of determination R2, a lower mean squared error, and a lower mean absolute error.

TABLE 1

| Metric | Always Default QoE Inference Model | Techniques Described Herein |
|---|---|---|
| Coefficient of determination R2 (closer to 1 the better) | 0.594 | 0.751 |
| Mean Squared Error (closer to 0 the better) | 0.635 | 0.391 |
| Mean Absolute Error (closer to 0 the better) | 0.496 | 0.421 |

Figure 4:
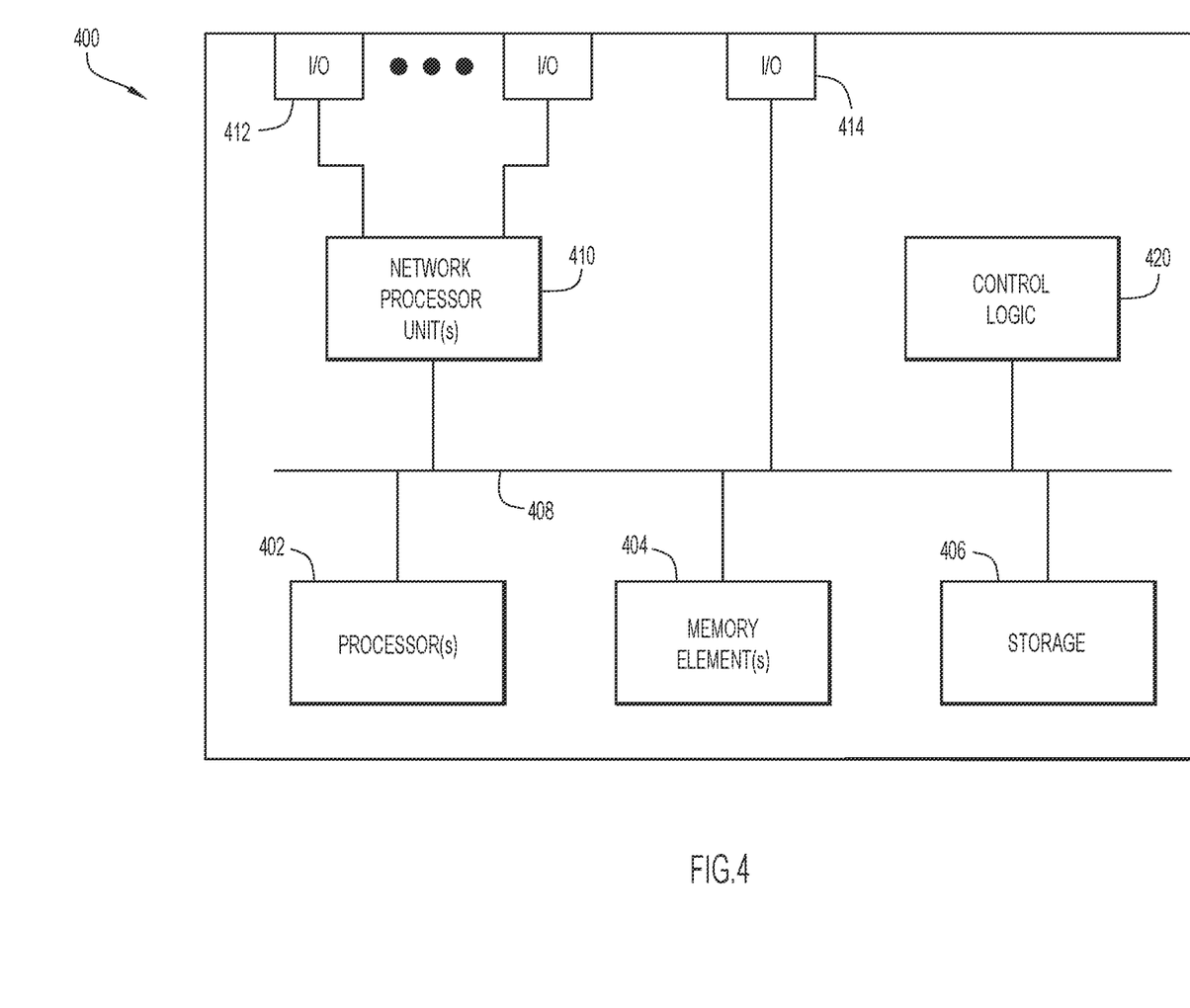
FIG. 4 illustrates a hardware block diagram of a computing device configured to perform functions associated with operations discussed herein, according to an example embodiment.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

Figure 5:
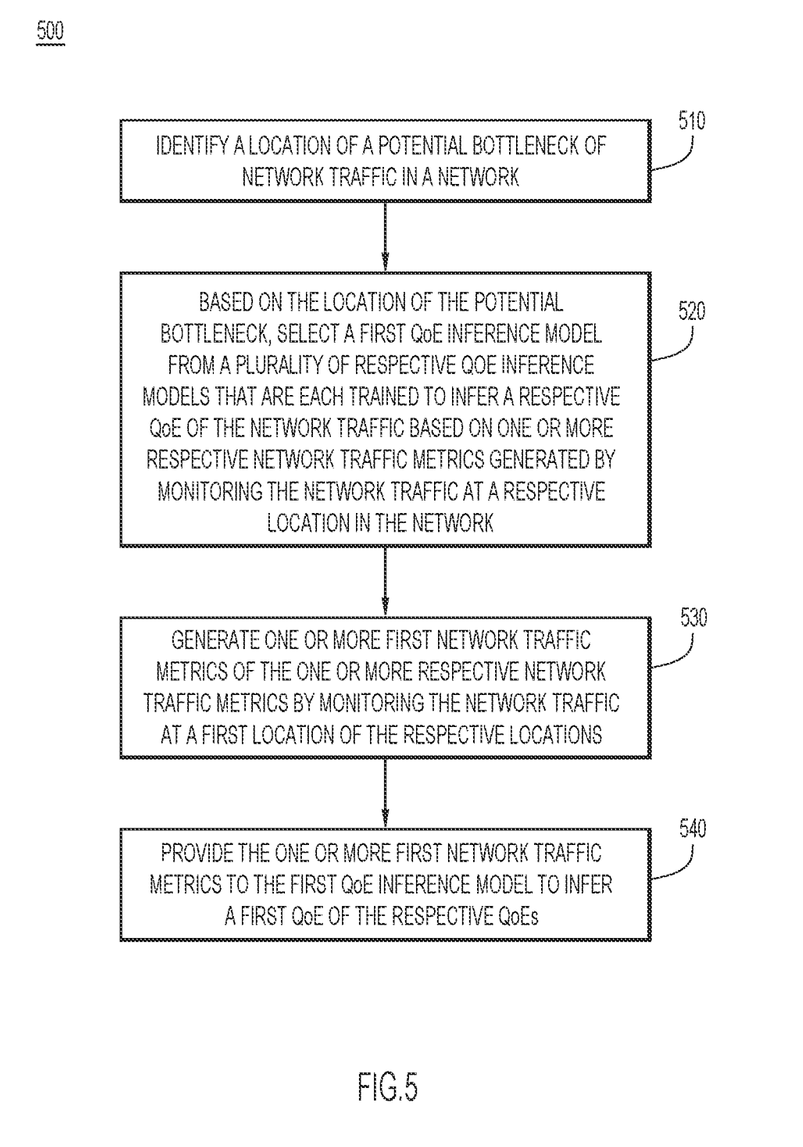
FIG. 5 illustrates a flowchart of a method for performing functions associated with operations discussed herein, according to an example embodiment.

FIG. 5 is a flowchart of an example method 500 for performing functions associated with operations discussed herein. Method 500 may be performed by any suitable entity, such as network traffic distribution node 120. At operation 510, a location of a potential bottleneck of network traffic in a network is identified. At operation 520, based on the location of the potential bottleneck, a first QoE inference model is selected from a plurality of respective QoE inference models. The respective QoE inference models are each trained to infer a respective QoE of the network traffic based on one or more respective network traffic metrics generated by monitoring the network traffic at a respective location in the network. At operation 530, one or more first network traffic metrics of the one or more respective network traffic metrics are generated by monitoring the network traffic at a first location of the respective locations. At operation 540, the one or more first network traffic metrics are provided to the first QoE inference model to infer a first QoE of the respective QoEs.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: identifying a location of a potential bottleneck of network traffic in a network; based on the location of the potential bottleneck, selecting a first QoE inference model from a plurality of respective QoE inference models that are each trained to infer a respective QoE of the network traffic based on one or more respective network traffic metrics generated by monitoring the network traffic at a respective location in the network; generating one or more first network traffic metrics of the one or more respective network traffic metrics by monitoring the network traffic at a first respective location; and providing the one or more first network traffic metrics to the first QoE inference model to infer a first respective QoE.

In one example, identifying the location of the potential bottleneck includes: determining one or more group network traffic criteria that collectively relate to network flows of the network traffic, wherein the network flows are streamed from a network traffic distribution node in the network to a plurality of client nodes; determining one or more first network traffic criteria that relate to a first network flow of the network flows, wherein the first network flow is streamed from the network traffic distribution node to a first client node of the plurality of client nodes; and comparing the one or more group network traffic criteria to the one or more first network traffic criteria.

In a further example, identifying the location of the potential bottleneck further includes: in response to comparing the one or more group network traffic criteria to the one or more first network traffic criteria, determining that a bottleneck of the network traffic is located between the network traffic distribution node and the first client node.

In another further example, identifying the location of the potential bottleneck further includes: in response to comparing the one or more group network traffic criteria to the one or more first network traffic criteria, determining that the potential bottleneck is located between a source node of the network traffic and the network traffic distribution node.

In still another further example, comparing the one or more group network traffic criteria to the one or more first network traffic criteria includes: comparing an average bit rate of the network flows to a first bit rate of the first network flow.

In one example, identifying the location of the potential bottleneck includes: determining one or more first network traffic criteria that relate to a first network flow of the network traffic originating from a first source node, wherein the first network flow is streamed from a network traffic distribution node in the network to a client node; determining one or more second network traffic criteria that relate to a second network flow of the network traffic originating from a second source node, wherein the second network flow is streamed from the network traffic distribution node to the client node; and comparing the one or more first network traffic criteria to the one or more second network traffic criteria.

In one example, the method further comprises: training each of the plurality of respective QoE inference models to infer the respective QoE.

In one example, the method further comprises: executing the first QoE inference model with the one or more first network traffic metrics to generate the first respective QoE.

In one example, the method further comprises: obtaining an indication of the first respective QoE from the first QoE inference model; and in response to obtaining the indication of the first respective QoE, automatically performing a network action to improve the first respective QoE.

In another form, an apparatus is provided. The apparatus comprises: a network interface configured to obtain or provide network communications; and one or more processors coupled to the network interface, wherein the one or more processors are configured to: identify a location of a potential bottleneck of network traffic in a network; based on the location of the potential bottleneck, select a first QoE inference model from a plurality of respective QoE inference models that are each trained to infer a respective QoE of the network traffic based on one or more respective network traffic metrics generated by monitoring the network traffic at a respective location in the network; generate one or more first network traffic metrics of the one or more respective network traffic metrics by monitoring the network traffic at a first respective location; and provide the one or more first network traffic metrics to the first QoE inference model to infer a first respective QoE.

In another form, one or more non-transitory computer readable storage media are provided. The non-transitory computer readable storage media are encoded with instructions that, when executed by a processor, cause the processor to: identify a location of a potential bottleneck of network traffic in a network; based on the location of the potential bottleneck, select a first QoE inference model from a plurality of respective QoE inference models that are each trained to infer a respective QoE of the network traffic based on one or more respective network traffic metrics generated by monitoring the network traffic at a respective location in the network; generate one or more first network traffic metrics of the one or more respective network traffic metrics by monitoring the network traffic at a first respective location; and provide the one or more first network traffic metrics to the first QoE inference model to infer a first respective QoE.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   identifying a location of a potential bottleneck of network traffic in a network based on network flows of the network traffic that are streamed from a network traffic distribution node in the network to a plurality of client nodes;
   based on the location of the potential bottleneck, selecting a first Quality of Experience (QoE) inference model from a plurality of respective QoE inference models that are each trained to infer a respective QoE of the network traffic based on one or more respective network traffic metrics generated by monitoring the network traffic at a respective location in the network;
   generating one or more first network traffic metrics of the one or more respective network traffic metrics by monitoring the network traffic at a first respective location; and
   providing the one or more first network traffic metrics to the first QoE inference model to infer a first respective QoE.

2. The method of claim 1, wherein identifying the location of the potential bottleneck includes:
   determining one or more group network traffic criteria that collectively relate to the network flows;
   determining one or more first network traffic criteria that relate to a first network flow of the network flows, wherein the first network flow is streamed from the network traffic distribution node to a first client node of the plurality of client nodes; and
   comparing the one or more group network traffic criteria to the one or more first network traffic criteria.

3. The method of claim 2, wherein identifying the location of the potential bottleneck further includes:
   in response to comparing the one or more group network traffic criteria to the one or more first network traffic criteria, determining that a bottleneck of the network traffic is located between the network traffic distribution node and the first client node.

4. The method of claim 2, wherein identifying the location of the potential bottleneck further includes:
   in response to comparing the one or more group network traffic criteria to the one or more first network traffic criteria, determining that the potential bottleneck is located between a source node of the network traffic and the network traffic distribution node.

5. The method of claim 2, wherein comparing the one or more group network traffic criteria to the one or more first network traffic criteria includes:
   comparing an average bit rate of the network flows to a first bit rate of the first network flow.

6. The method of claim 1, further comprising:
   training each of the plurality of respective QoE inference models to infer the respective QoE.

7. The method of claim 1, further comprising:
   executing the first QoE inference model with the one or more first network traffic metrics to generate the first respective QoE.

8. The method of claim 1, further comprising:
   obtaining an indication of the first respective QoE from the first QoE inference model; and
   in response to obtaining the indication of the first respective QoE, automatically performing a network action to improve the first respective QoE.

9. An apparatus comprising:
   a network interface configured to obtain or provide network communications; and
   one or more processors coupled to the network interface, wherein the one or more processors are configured to:
   identify a location of a potential bottleneck of network traffic in a network based on network flows of the network traffic that are streamed from a network traffic distribution node in the network to a plurality of client nodes;
   based on the location of the potential bottleneck, select a first Quality of Experience (QoE) inference model from a plurality of respective QoE inference models that are each trained to infer a respective QoE of the network traffic based on one or more respective network traffic metrics generated by monitoring the network traffic at a respective location in the network;
   generate one or more first network traffic metrics of the one or more respective network traffic metrics by monitoring the network traffic at a first respective location; and
   provide the one or more first network traffic metrics to the first QoE inference model to infer a first respective QoE.

10. The apparatus of claim 9, wherein the one or more processors are configured to:
    determine one or more group network traffic criteria that collectively relate to the network flows;
    determine one or more first network traffic criteria that relate to a first network flow of the network flows, wherein the first network flow is streamed from the network traffic distribution node to a first client node of the plurality of client nodes; and
    compare the one or more group network traffic criteria to the one or more first network traffic criteria.

11. The apparatus of claim 10, wherein the one or more processors are configured to:
    in response to comparing the one or more group network traffic criteria to the one or more first network traffic criteria, determine that a bottleneck of the network traffic is located between the network traffic distribution node and the first client node.

12. The apparatus of claim 10, wherein the one or more processors are configured to:
    in response to comparing the one or more group network traffic criteria to the one or more first network traffic criteria, determine that the potential bottleneck is located between a source node of the network traffic and the network traffic distribution node.

13. The apparatus of claim 10, wherein the one or more processors are configured to:
compare an average bit rate of the network flows to a first bit rate of the first network flow.

14. The apparatus of claim 9, wherein the one or more processors are further configured to:
train each of the plurality of respective QoE inference models to infer the respective QoE.

15. The apparatus of claim 9, wherein the one or more processors are further configured to:
execute the first QoE inference model with the one or more first network traffic metrics to generate the first respective QoE.

16. The apparatus of claim 9, wherein the one or more processors are further configured to:
obtain an indication of the first respective QoE from the first QoE inference model; and
in response to obtaining the indication of the first respective QoE, automatically perform a network action to improve the first respective QoE.

17. One or more non-transitory computer readable storage media encoded with instructions that, when executed by a processor, cause the processor to:
identify a location of a potential bottleneck of network traffic in a network based on network flows of the network traffic that are streamed from a network traffic distribution node in the network to a plurality of client nodes;
based on the location of the potential bottleneck, select a first Quality of Experience (QoE) inference model from a plurality of respective QoE inference models that are each trained to infer a respective QoE of the network traffic based on one or more respective network traffic metrics generated by monitoring the network traffic at a respective location in the network;
generate one or more first network traffic metrics of the one or more respective network traffic metrics by monitoring the network traffic at a first respective location; and
provide the one or more first network traffic metrics to the first QoE inference model to infer a first respective QoE.

18. The one or more non-transitory computer readable storage media of claim 17, wherein the instructions cause the processor to:
determine one or more group network traffic criteria that collectively relate to the network flows;
determine one or more first network traffic criteria that relate to a first network flow of the network flows, wherein the first network flow is streamed from the network traffic distribution node to a first client node of the plurality of client nodes; and
compare the one or more group network traffic criteria to the one or more first network traffic criteria.

19. The one or more non-transitory computer readable storage media of claim 17, wherein the instructions further cause the processor to:
train each of the plurality of respective QoE inference models to infer the respective QoE.

20. The one or more non-transitory computer readable storage media of claim 17, wherein the instructions further cause the processor to:
execute the first QoE inference model with the one or more first network traffic metrics to generate the first respective QoE.

* * * * *